(12) United States Patent
Goswami et al.

(10) Patent No.: US 12,411,959 B2
(45) Date of Patent: Sep. 9, 2025

(54) SYSTEMS, METHODS, AND APPARATUSES FOR DETECTING AND IMPLEMENTING VULNERABILITY FIXES IN AN ELECTRONIC ENVIRONMENT

(71) Applicant: BANK OF AMERICA CORPORATION, Charlotte, NC (US)

(72) Inventors: Debraj Goswami, Telangana (IN); Vipul Verma, Haryana (IN); Anant Gupta, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 337 days.

(21) Appl. No.: 18/133,262

(22) Filed: Apr. 11, 2023

(65) Prior Publication Data
US 2024/0346151 A1    Oct. 17, 2024

(51) Int. Cl.
G06F 21/00    (2013.01)
G06F 21/57    (2013.01)

(52) U.S. Cl.
CPC ...... G06F 21/577 (2013.01); *G06F 2221/034* (2013.01)

(58) Field of Classification Search
CPC .. G06F 2221/034; G06F 21/577; G06F 21/50; H04L 63/14; H04L 63/1433
USPC .......................................................... 726/25
See application file for complete search history.

(56) References Cited

U.S. PATENT DOCUMENTS

| | | |
|---|---|---|
| 7,113,914 B1 | 9/2006 | Spielmann |
| 7,278,163 B2 | 10/2007 | Banzhof |
| 9,325,728 B1 | 4/2016 | Kennedy |
| 9,374,390 B1 | 6/2016 | Teal |
| 9,411,965 B2 * | 8/2016 | Giakouminakis ....... G06F 21/57 |
| 9,697,362 B2 | 7/2017 | Kaplan |
| 9,977,904 B2 | 5/2018 | Khan |
| 10,305,919 B2 | 5/2019 | Locasto |
| 10,534,917 B2 | 1/2020 | Segal |
| 10,686,823 B2 | 6/2020 | Gorodissky |
| 10,776,497 B2 | 9/2020 | Wysopal |
| 10,812,522 B2 | 10/2020 | Steele |
| 10,873,595 B1 | 12/2020 | Oliphant |
| 11,171,981 B2 | 11/2021 | Kaplan |
| 11,451,572 B2 | 9/2022 | Yampolskiy |

(Continued)

*Primary Examiner* — Josnel Jeudy
(74) *Attorney, Agent, or Firm* — Moore & Van Allen PLLC; Lauren M. Stokes

(57) ABSTRACT

Systems, computer program products, and methods are described herein for detecting and implementing vulnerability fixes in an electronic environment. The present disclosure is configured to: receive a vulnerability trigger; parse data associated with the vulnerability trigger; generate a vulnerability assessment environment and apply the parsed data; generate vulnerability assessment data comprising at least one computing environment component associated with the vulnerability trigger; apply a long short-term memory network model to the vulnerability assessment data to generate at least one potential fix for the at least one computing environment component; input the at least one potential fix to at least one potential fix assessment environment; generate a functionality confidence metric and a vulnerability confidence metric for the at least one potential fix associated with the at least one computing environment component; and implement the at least one potential fix for the at least one computing environment component.

20 Claims, 10 Drawing Sheets

(56) References Cited

U.S. PATENT DOCUMENTS

| | | |
|---|---|---|
| 11,604,883 B2 | 3/2023 | Bhalla |
| 11,645,396 B2 | 5/2023 | Inagaki |
| 2006/0101517 A1 | 5/2006 | Banzhof |
| 2007/0094735 A1 | 4/2007 | Cohen |
| 2013/0081140 A1* | 3/2013 | Sutherland ............ G06F 21/577 |
| | | 726/23 |
| 2017/0053108 A1* | 2/2017 | Jakobsson ............... G06F 21/32 |
| 2025/0103438 A1* | 3/2025 | Gildein ............... G06F 11/1461 |

* cited by examiner

SYSTEMS, METHODS, AND APPARATUSES FOR DETECTING AND IMPLEMENTING VULNERABILITY FIXES IN AN ELECTRONIC ENVIRONMENT

TECHNOLOGICAL FIELD

Example embodiments of the present disclosure relate to detecting and implementing vulnerability fixes in an electronic environment.

BACKGROUND

Managers of an electronic environment comprising computing environment components, such as software components, hardware components, and other infrastructure components, have a difficult time determining and implementing fixes to the computing environment components when new vulnerabilities are detected. For instance, and where a new attack has occurred and/or a new potential misuse of the computing environment component has been detected, there exists a need to accurately, efficiently, and automatically implement temporary fixes to the computing environment components to protect the computing environment as a whole and protect the source code of the computing environment components individually. Further, there exists a need for the temporary fixes which are best suited for the particular computing environment component such that the computing environment component can continue to function at its necessary capacity for the computing environment and or the associated entity organization's needs, without allowing the vulnerability of the computing environment component to hinder the functionality and purpose of the computing environment component.

Applicant has identified a number of deficiencies and problems associated with detecting and implementing vulnerability fixes in an electronic environment. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for detecting and implementing vulnerability fixes in an electronic environment.

In one aspect, a system for detecting and implementing vulnerability fixes is provided. The system may comprise: a memory device with computer-readable program code stored thereon; at least one processing device operatively coupled to the at least one memory device and the at least one communication device, wherein executing the computer-readable code is configured to cause the at least one processing device to: receive a vulnerability trigger; parse data associated with the vulnerability trigger; generate a vulnerability assessment environment and apply the parsed data of the vulnerability trigger; generate, based on the vulnerability assessment environment, vulnerability assessment data comprising at least one computing environment component associated with the vulnerability trigger; apply a long short-term memory network model to the vulnerability assessment data to generate at least one potential fix for the at least one computing environment component associated with the vulnerability trigger; input the at least one potential fix to at least one potential fix assessment environment; generate, based on the at least one potential fix assessment environment, a functionality confidence metric and a vulnerability confidence metric for the at least one potential fix associated with the at least one computing environment component; identify a vulnerability confidence threshold and a functionality confidence threshold based on the at least one computing environment component and the at least one potential fix; and implement the at least one potential fix for the at least one computing environment component, wherein, in an instance where the functionality confidence metric meets the functionality confidence threshold and the vulnerability confidence metric meets the vulnerability confidence threshold, implement the at least one potential fix to the at least one computing environment component, or wherein, in an instance where the functionality confidence metric does not meet the functionality confidence threshold or the vulnerability confidence metric does not meet the vulnerability confidence threshold, do not implement the at least one potential fix to the at least one computing environment component.

In some embodiments, the processing device is further configured to: input, in response to the at least one potential fix not being implemented, the at least one potential fix associated with the at least one computing environment component to a potential fix generator engine, wherein the potential fix generator engine comprises the long short-term memory network; and generate, by the potential fix generator engine, at least one updated potential fix, wherein the at least one updated potential fix comprises at least one of a repackaged at least one potential fix, a reprioritization of the at least one potential fix, or at least one new potential fix.

In some embodiments, the processing device is further configured to: receive an original equipment manufacturer (OEM) fix indication, wherein the OEM fix indication is associated with the vulnerability trigger, wherein the OEM fix indication is associated with at least one OEM fix; remove, in response to the OEM fix indication, the at least one potential fix that was implemented from the at least one computing environment component; and implement the at least one OEM fix to the at least one computing environment component.

In some embodiments, the processing device is further configured to: monitor, based on inputting the at least one potential fix to the at least one potential fix assessment environment, the at least one potential fix in the at least one potential fix assessment environment; analyze the at least one potential fix and the associated at least one computing environment component to determine the functionality confidence metric, wherein the functionality confidence metric is based on a functionality of the at least one computing environment component with the at least one potential fix; and analyze the at least one potential fix and the associated at least one computing environment component to determine the vulnerability confidence metric, wherein the vulnerability confidence metric is based on a potential misuse of the at least one computing environment component with the at least one potential fix. In some embodiments, the processing device is further configured to: determine the vulnerability confidence threshold based on the at least one computing environment component and an associated vulnerability allowance; and determine the functionality confidence threshold based on the at least one computing environment component and an associated critical score.

In some embodiments, the processing device is further configured to: receive, by the long short-term memory network model, entity organization data associated with the at least one computing environment component; and receive, by the long short-term memory network model, pattern data associated at least one previous vulnerability instance.

In some embodiments, the vulnerability is a zero-day vulnerability.

In some embodiments, the vulnerability assessment environment comprises an isolated simulation of a computing environment associated with the vulnerability trigger.

In some embodiments, the at least one potential fix assessment environment comprises an isolated simulation of a computing environment and the at least one computing environment component associated with the vulnerability trigger. In some embodiments, the at least one potential fix comprises a plurality of potential fixes, and wherein the at least one potential fix assessment environment comprises a plurality of potential fix assessment environments configured to assess each potential fix of the plurality of potential fixes for each computing environment component.

In some embodiments, the processing device is further configured to: compare the parsed data associated with the vulnerability trigger with a vulnerability signature library, wherein the vulnerability signature library comprises at least one previous vulnerability trigger instance and associated previous small fix instance; and determine the at least one potential fix based on the previous small fix instance, wherein, in an instance where the parsed data associated with the vulnerability trigger matches the previous vulnerability trigger instance associated with the previous small fix instance.

In some embodiments, the vulnerability assessment environment comprises at least one heuristic model, and wherein the at least one heuristic model comprises at least one of a region model, an author model, a signature model, or a misuse model. In some embodiments, the at least one heuristic model comprises at least one machine learning model configured to determine at least one potential fix based on at least one previous instance and the associated with at least one previous fix, and at least one potential misuse for the vulnerability trigger.

In some embodiments, the at least one potential fix is monitored in the at least one potential fix assessment environment for a pre-determined period to determine at least one of the functionality confidence metric or the vulnerability confidence metric.

In another aspect, a computer program product for detecting and implementing vulnerability fixes is provided. In some embodiments, the computer program product may comprise at least one non-transitory computer-readable medium having computer-readable program code portions embodied therein, the computer-readable program code portions which when executed by a processing device are configured to cause a processor to: receive a vulnerability trigger; parse data associated with the vulnerability trigger; generate a vulnerability assessment environment and apply the parsed data of the vulnerability trigger; generate, based on the vulnerability assessment environment, vulnerability assessment data comprising at least one computing environment component associated with the vulnerability trigger; apply a long short-term memory network model to the vulnerability assessment data to generate at least one potential fix for the at least one computing environment component associated with the vulnerability trigger; input the at least one potential fix to at least one potential fix assessment environment; generate, based on the at least one potential fix assessment environment, a functionality confidence metric and a vulnerability confidence metric for the at least one potential fix associated with the at least one computing environment component; identify a vulnerability confidence threshold and a functionality confidence threshold based on the at least one computing environment component and the at least one potential fix; and implement the at least one potential fix for the at least one computing environment component, wherein, in an instance where the functionality confidence metric meets the functionality confidence threshold and the vulnerability confidence metric meets the vulnerability confidence threshold, implement the at least one potential fix to the at least one computing environment component, or wherein, in an instance where the functionality confidence metric does not meet the functionality confidence threshold or the vulnerability confidence metric does not meet the vulnerability confidence threshold, do not implement the at least one potential fix to the at least one computing environment component.

In some embodiments, the processing device is configured to cause the processor to: input, in response to the at least one potential fix not being implemented, the at least one potential fix associated with the at least one computing environment component to a potential fix generator engine, wherein the potential fix generator engine comprises the long short-term memory network; and generate, by the potential fix generator engine, at least one updated potential fix, wherein the at least one updated potential fix comprises at least one of a repackaged at least one potential fix, a reprioritization of the at least one potential fix, or at least one new potential fix.

In some embodiments, the processing device is configured to cause the processor to: monitor, based on inputting the at least one potential fix to the at least one potential fix assessment environment, the at least one potential fix in the at least one potential fix assessment environment; analyze the at least one potential fix and the associated at least one computing environment component to determine the functionality confidence metric, wherein the functionality confidence metric is based on a functionality of the at least one computing environment component with the at least one potential fix; and analyze the at least one potential fix and the associated at least one computing environment component to determine the vulnerability confidence metric, wherein the vulnerability confidence metric is based on a potential misuse of the at least one computing environment component with the at least one potential fix.

In another aspect, a computer-implemented method for detecting and implementing vulnerability fixes is provided. In some embodiments, the computer-implemented method may comprise: receiving a vulnerability trigger; parsing data associated with the vulnerability trigger; generating a vulnerability assessment environment and apply the parsed data of the vulnerability trigger; generating, based on the vulnerability assessment environment, vulnerability assessment data comprising at least one computing environment component associated with the vulnerability trigger; applying a long short-term memory network model to the vulnerability assessment data to generate at least one potential fix for the at least one computing environment component associated with the vulnerability trigger; inputting the at least one potential fix to at least one potential fix assessment environment; generating, based on the at least one potential fix assessment environment, a functionality confidence metric and a vulnerability confidence metric for the at least one potential fix associated with the at least one computing environment component; identifying a vulnerability confidence threshold and a functionality confidence threshold based on the at least one computing environment component and the at least one potential fix; and implementing the at least one potential fix for the at least one computing environment component, wherein, in an instance where the functionality confidence metric meets the functionality confidence threshold and the vulnerability confidence metric meets the vulnerability confidence threshold, implement the at least one potential fix to the at least one computing environment component, or wherein, in an instance where the functionality confidence metric does not meet the functionality confidence threshold or the vulnerability confidence metric does not meet the vulnerability confidence threshold, do not implement the at least one potential fix to the at least one computing environment component.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
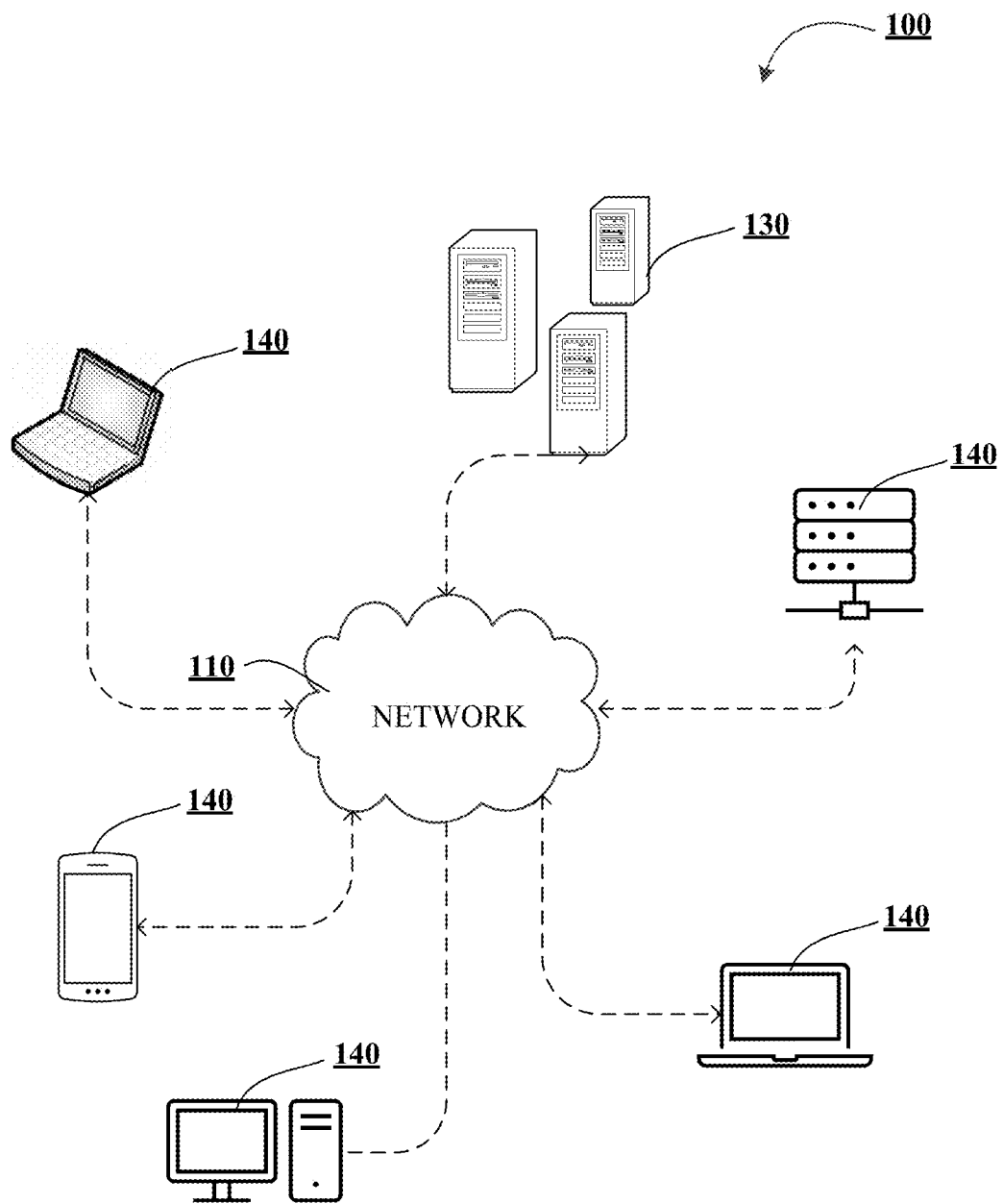
Figure 1B:
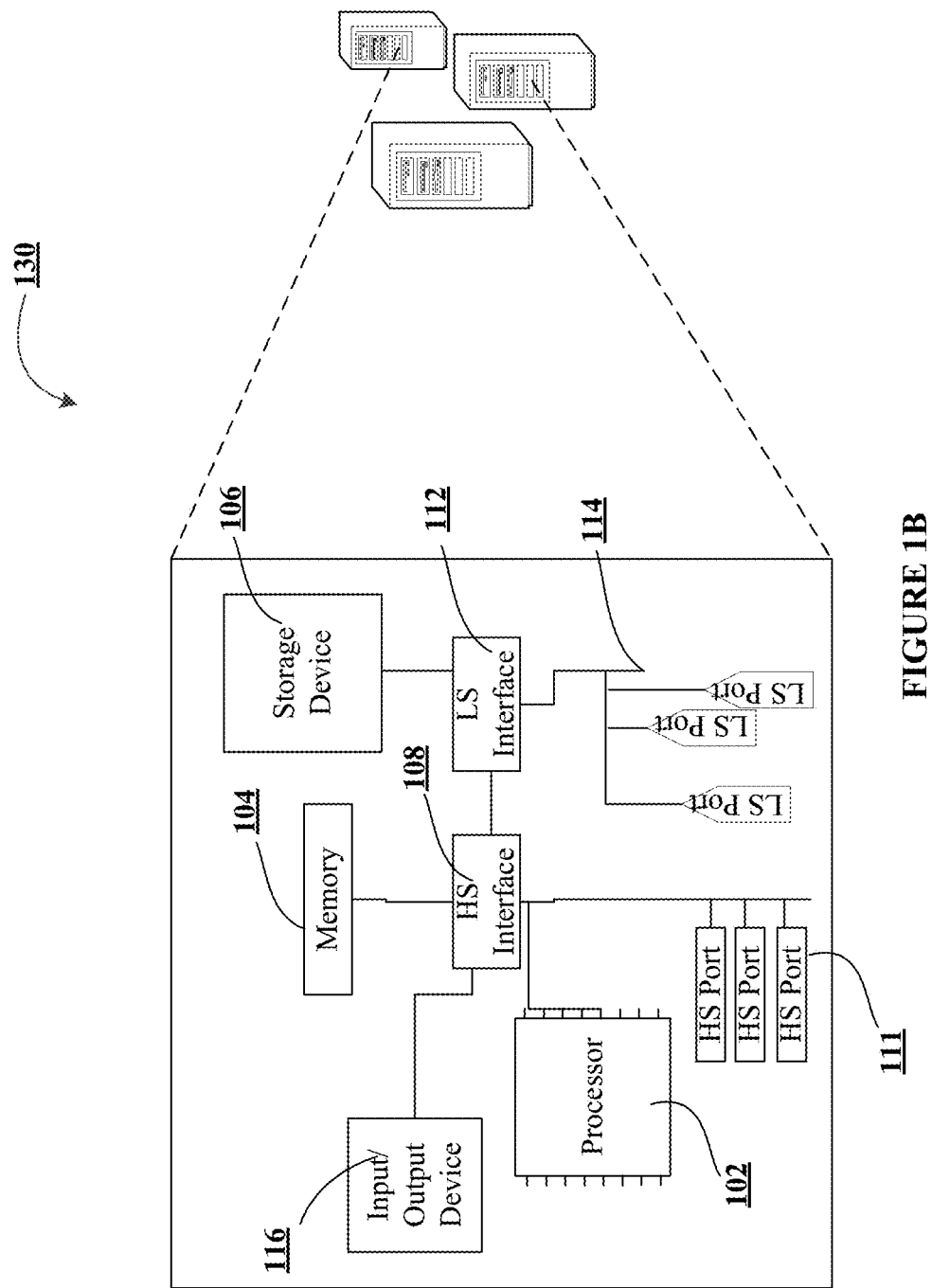
Figure 1C:
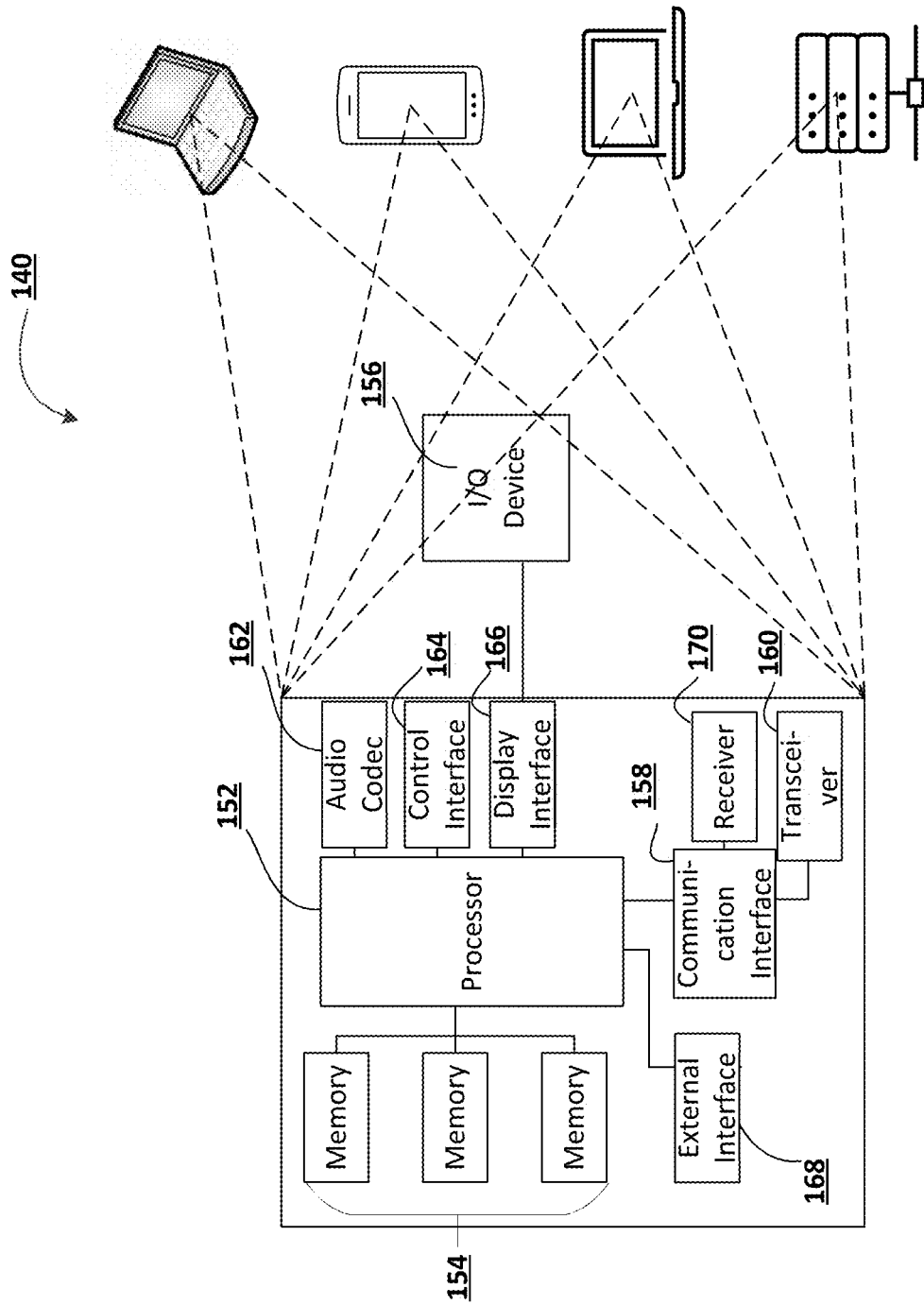
Figure 2:
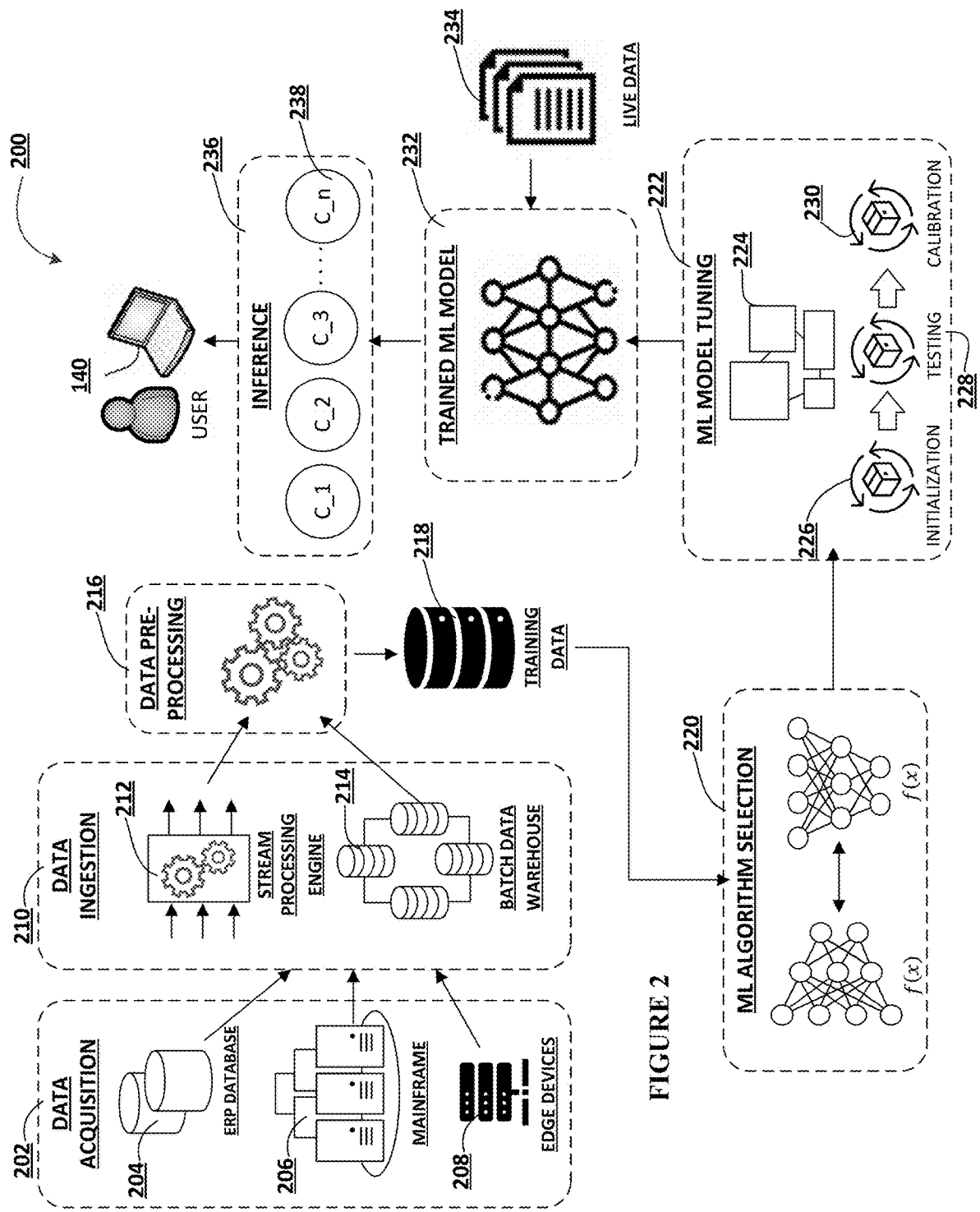
Figure 3:
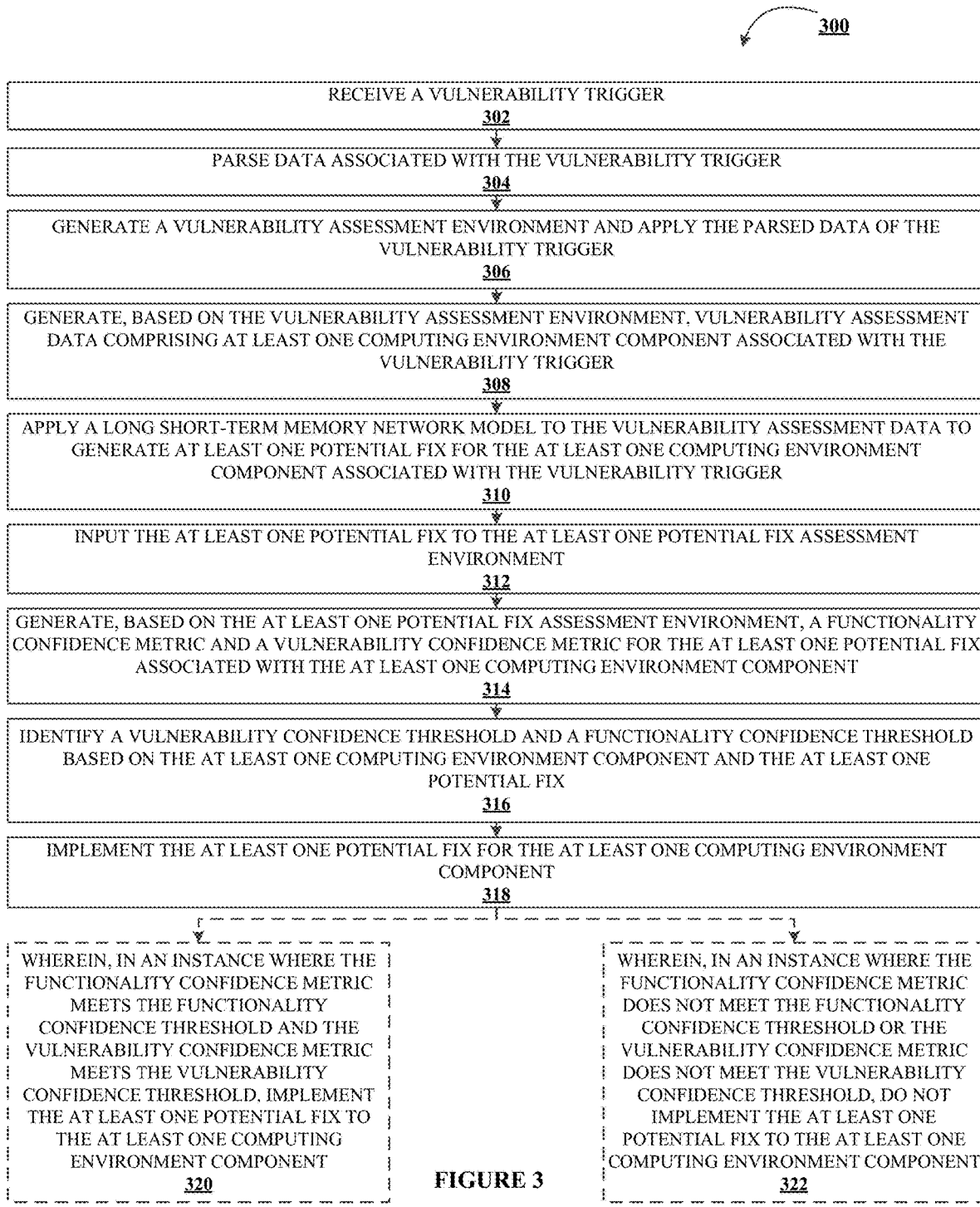
Figure 4:
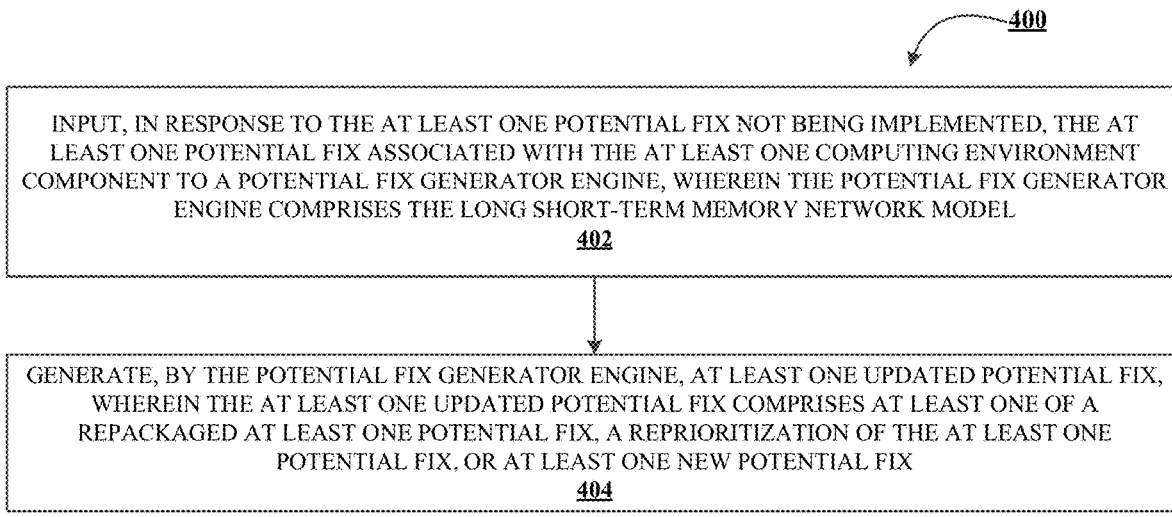
Figure 5:
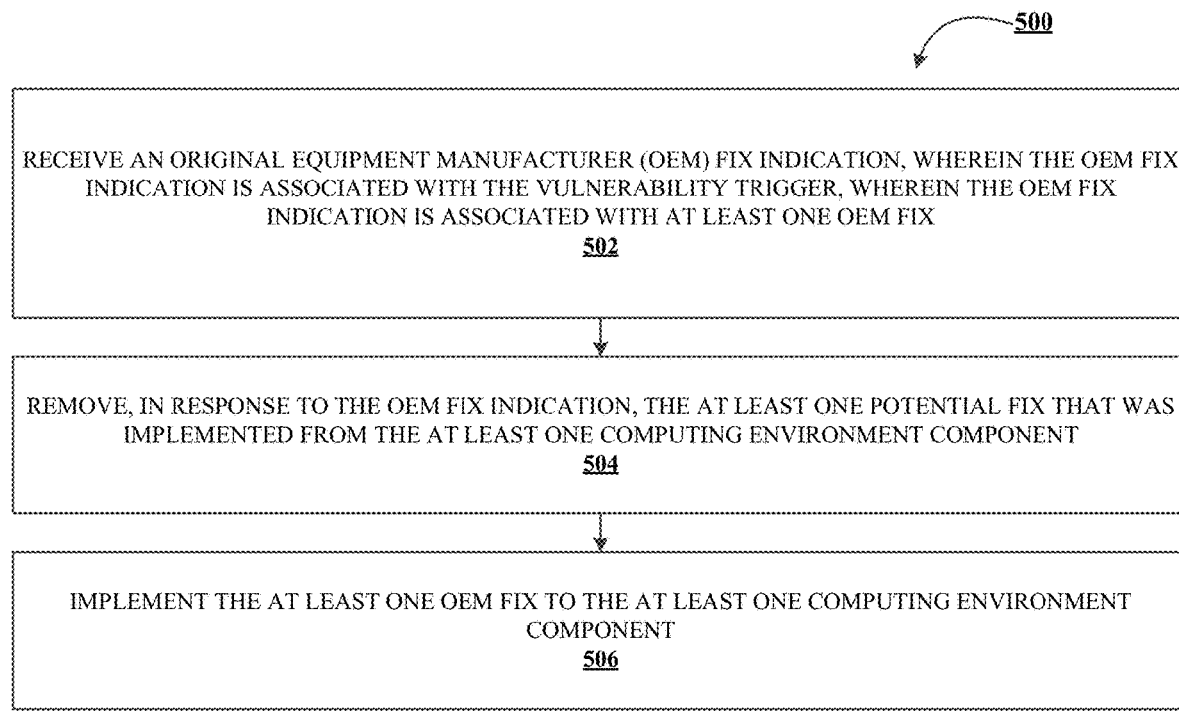
Figure 6:
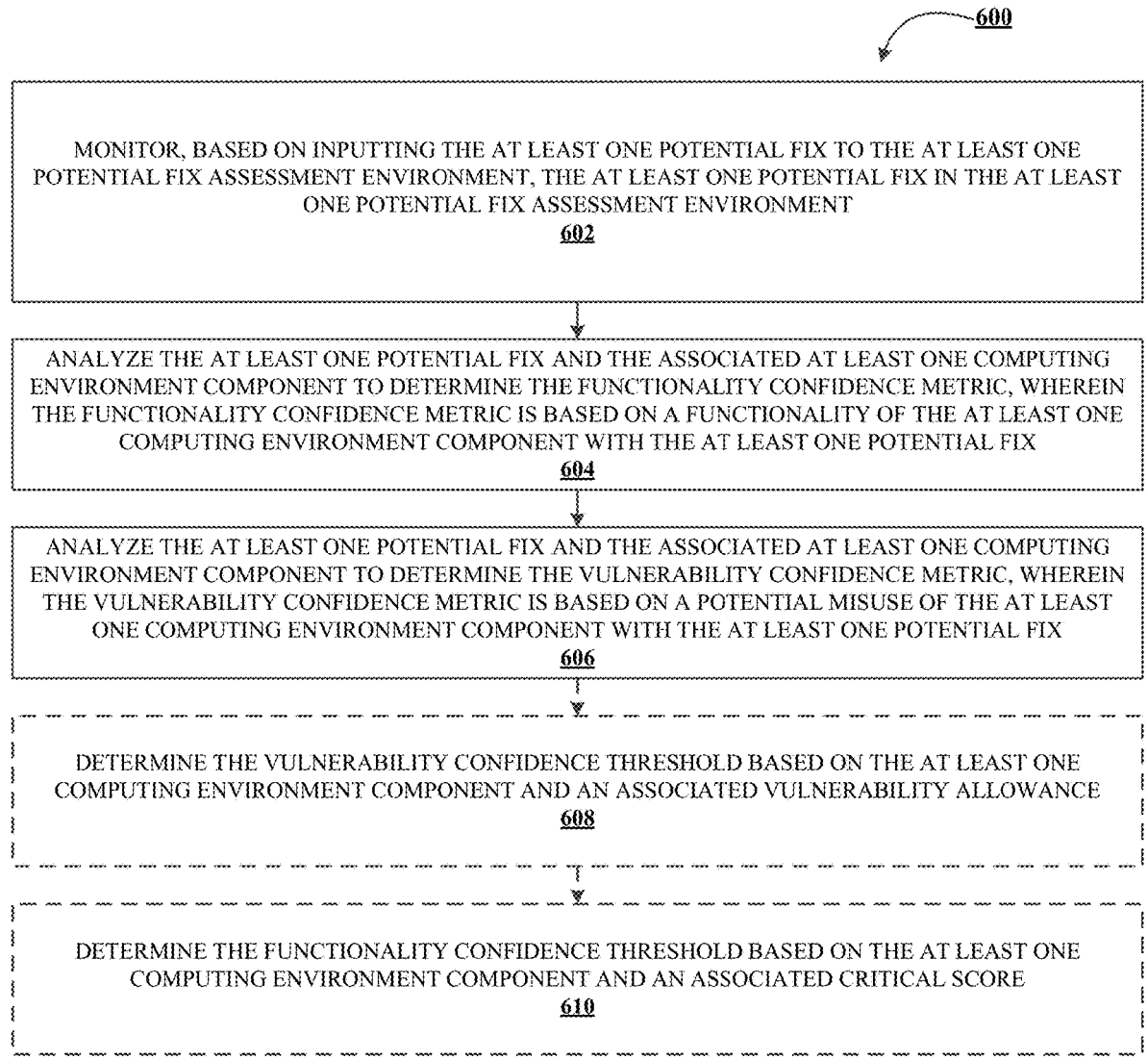
Figure 7:
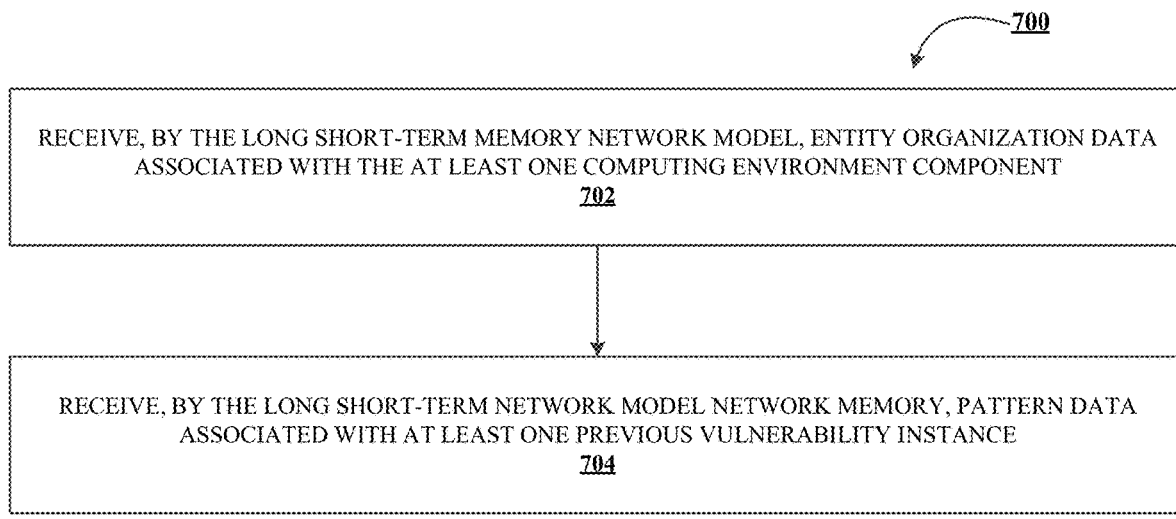
Figure 8:
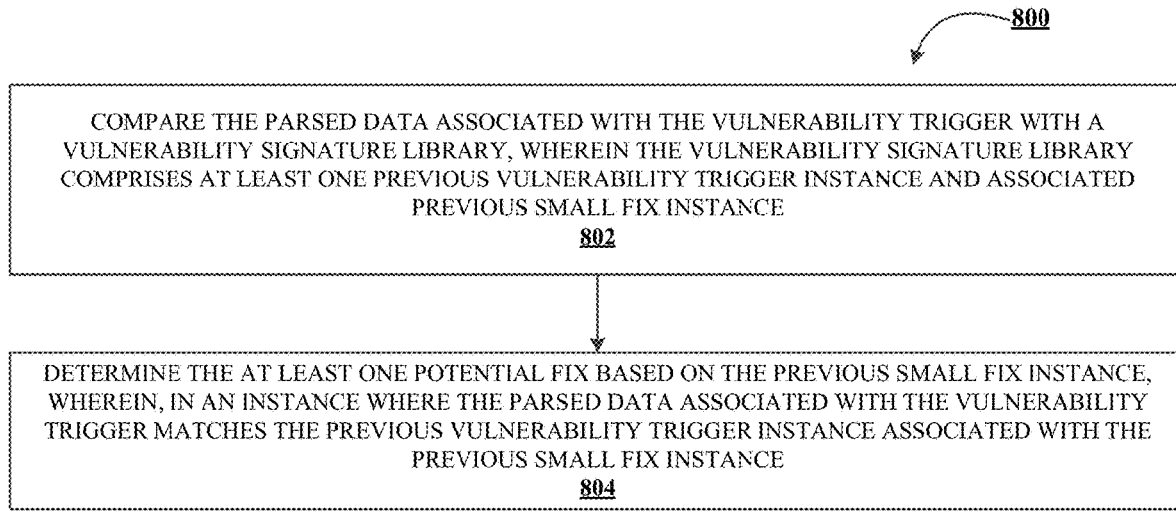

FIGS. 1A-1C illustrates technical components of an exemplary distributed computing environment for detecting and implementing vulnerability fixes in an electronic environment, in accordance with an embodiment of the disclosure;

FIG. 2 illustrates technical components of an exemplary machine learning environment, in accordance with an embodiment of the disclosure;

FIG. 3 illustrates a process flow for detecting and implementing vulnerability fixes in an electronic environment, in accordance with an embodiment of the disclosure;

FIG. 4 illustrates a process flow for generating an updated potential fix, in accordance with an embodiment of the disclosure;

FIG. 5 illustrates a process flow for implementing the OEM fix(es) to the computing environment component(s), in accordance with an embodiment of the disclosure;

FIG. 6 illustrates a process flow for generating the vulnerability confidence metric and functionality confidence metric and determining the vulnerability confidence threshold and the functionality confidence threshold, in accordance with an embodiment of the disclosure;

FIG. 7 illustrates a process flow for receiving entity organization data and pattern data for the long-short term network memory, in accordance with an embodiment of the disclosure; and FIG. 8 illustrates a process flow for determining a potential fix based on previous small fix instance, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers of an electronic environment comprising computing environment components, such as software components, hardware components, and other infrastructure components, have a difficult time determining and implementing fixes to the computing environment components when new vulnerabilities are detected. For instance, and where a new attack has occurred and/or a new potential misuse of the computing environment component has been detected, there exists a need to accurately, efficiently, and automatically implement temporary fixes to the computing environment components to protect the computing environment as a whole and protect the source code of the computing environment components, individually. Further, there exists a need for the temporary fixes which are best suited for the effected computing environment component(s) such that the computing environment component(s) can continue to function at its necessary capacity for the computing environment and or the associated entity organization's needs, without allowing the vulnerability of the computing environment component to hinder the functionality and purpose of the computing environment component.

Thus, there exists a need to generate and implement a system designed to generate/determine and implement temporary potential fixes to computing environments which are facing new vulnerabilities (e.g., zero-day vulnerabilities) which do not currently have an original equipment manufacturer fix, such as the vulnerability fix system described herein.

Accordingly, the vulnerability fix system acts by receiving a vulnerability trigger; parsing data associated with the vulnerability trigger (e.g., to access the data associated with the vulnerability trigger and the vulnerability signature); generating a vulnerability assessment environment and apply the parsed data of the vulnerability trigger; generating, based on the vulnerability assessment environment, vulnerability assessment data comprising at least one computing environment component (e.g., the computing environment component(s) affected by the vulnerability trigger) associated with the vulnerability trigger; and applying a long short-term memory network model to the vulnerability assessment data to generate at least one potential fix for the at least one computing environment component associated with the vulnerability trigger. Further, the vulnerability fix system may act by inputting the at least one potential fix to at least one potential fix assessment environment (e.g., to test the at least one potential fix to determine whether it can be implemented); generating, based on the at least one potential fix assessment environment, a functionality confidence metric (e.g., to test the computing environment component's functionality with the potential fix and the vulnerability/misuse of the computing environment component) and a vulnerability confidence metric (e.g., to test the computing environment component's vulnerability based on applying the potential fix and determining how vulnerable the computing environment component still is) for the at least one potential fix associated with the at least one computing environment component; identify a vulnerability confidence threshold and a functionality confidence threshold based on the at least one computing environment component and the at least one potential fix; and implement the at least one potential fix for the at least one computing environment component.

In some embodiments, the vulnerability fix system may determine whether to implement the potential fix based on implementing, in an instance where the functionality confidence metric meets the functionality confidence threshold (i.e., the functionality confidence metric is higher than the functionality confidence threshold) and the vulnerability confidence metric meets the vulnerability confidence threshold (i.e., the vulnerability confidence metric is lower than the vulnerability confidence threshold), the at least one potential fix to the at least one computing environment component. In some embodiments, the vulnerability fix system may not implement the potential fix to the at least one computing environment component, in an instance where the functionality confidence metric does not meet the functionality confidence threshold (i.e., the functionality confidence metric is lower than the functionality confidence threshold) or the vulnerability confidence metric does not meet the vulnerability confidence threshold (i.e., the vulnerability confidence metric is lower than the vulnerability confidence threshold).

What is more, the present disclosure provides a technical solution to a technical problem. As described herein, the technical problem includes the generation/determination and implementation of fixes for computing environments and their associated computing environment components when faced with a new vulnerability (e.g., a zero-day vulnerability), where an original equipment manufacturer (OEM) fix is not available. The technical solution presented herein allows for the accurate, efficient, and automatic generation/determination and implementation of temporary fixes for a computing environment and its associated computing environment components. In particular, the vulnerability fix system is an improvement over existing solutions to the implementation of fixes for zero-day vulnerabilities, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detecting and implementing vulnerability fixes in an electronic environment 100, in accordance with an embodiment of the invention. As shown in FIG. 1A, the distributed computing environment 100 contemplated herein may include a system 130 (i.e., virtual resource transfer device system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 (shown as "LS Interface") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . . $C\_n$ 238) live data 234 based on how similar they are to one another to solve exploratory challenges where little is known about the data, provide a description or label (e.g., $C\_1$, $C\_2$ . . . . $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for detecting and implementing vulnerability fixes in an electronic environment, in accordance with an embodiment of the disclosure. In some embodiments, a system (e.g., similar to one or more of the systems described herein with respect to FIGS. 1A-1C and 2) may perform one or more of the steps of process flow 300. For example, a vulnerability fix system (e.g., the system 130 described herein with respect to FIG. 1A-1C) may perform the steps of process 300, which may further be configured to implement at least one machine learning and/or an artificial intelligence engine (e.g., such as machine learning model 200 shown in FIG. 2) to perform the steps of process 300.

As shown in block 302, the process flow 300 may include the step of receiving a vulnerability trigger. As used herein, the term "vulnerability trigger" refers to an indication of a security flaw in computing system, whereby the security flaw has not yet been fixed and/or given a patch (e.g., such as a zero-day vulnerability where the vulnerability trigger is newly generated and/or identified). In some embodiments, the vulnerability trigger may be received from over a network (e.g., network 110 of FIG. 1A), and may have been generated by a bad actor intent on attacking the computing system. In some embodiments, the vulnerability trigger may be uploaded to the computing system by a bad actor at a terminal of the computing system (e.g., a terminal such as mobile device, a laptop, and/or the like) in communication with a server of the computing system.

Further, and as used herein, the vulnerability trigger may comprise vulnerability data that can be parsed by the vulnerability fix system to determine which computing environment component(s) will be affected by the vulnerability trigger. Additionally, and in some embodiments, the vulnerability trigger may comprise and/or be associated with a vulnerability signature, whereby the vulnerability signature which may comprise a unique pattern and/or string which is a representation of the vulnerability language and associated misuses and/or attacks on the computing system components/computing environment components (e.g., applications, hardware components, software components, infrastructure, and/or the like).

As shown in block 304, the process flow 300 may include the step of parsing data associated with the vulnerability trigger. By way of non-limiting example, the vulnerability fix system may parse the data of the vulnerability trigger and/or the vulnerability signature associated with the vulnerability trigger, such that the vulnerability fix system can determine all the potential computing system component(s)/ computing environment component(s) that will be affected by the vulnerability trigger and the potential outcomes of the vulnerability trigger on these computing system component(s)/computing environment component(s).

As shown in block 306, the process flow 300 may include the step of generating a vulnerability assessment environment and applying the parsed data of the vulnerability trigger. By way of non-limiting example, the vulnerability fix system may generate the vulnerability assessment environment to analyze the parsed data of the vulnerability trigger and/or the vulnerability signature. In some embodiments, the vulnerability assessment environment may comprise an isolated environment from the computing environment associated with the vulnerability trigger (i.e., the computing environment and associated computing environment component(s) that the vulnerability trigger is intended to attack and/or affect), and the vulnerability assessment environment may comprise simulated computing environment components to closely resemble or match the real-life computing environment components of the computing environment. Thus, and in some embodiments, the vulnerability fix system may input the vulnerability trigger and associated data of the vulnerability trigger to the vulnerability assessment environment and track each of the effects of the vulnerability trigger on the simulated computing environment components to determine how each computing environment component will be affected if the vulnerability trigger and associated data is not fixed.

In some embodiments, the vulnerability assessment environment may comprise at least one heuristics model and/or a plurality of heuristics models which may comprise and/or be used in combination with at least one machine learning model, to determine which computing environment components will be affected and what-if any-potential fixes may be implemented to fix affected computing environment components. For instance, and in some embodiments, the at least one heuristic model may comprise at least one of a region model, an author model, a signature model, or a misuse model.

As used herein, the region model may refer to a machine learning model configured to determine the region of computing environment components that will be affected by the vulnerability trigger, and may consider data of the vulnerability trigger associated with the target of the vulnerability trigger (e.g., the target computing environment component); the origin of the vulnerability trigger (e.g., the geographic region where the vulnerability trigger was created); the group of the vulnerability trigger (e.g., the group of computing environment components affected by the vulnerability trigger); and/or the like.

As used herein, the author model may refer to a machine learning model configured to determine details regarding the author/generator of the vulnerability trigger, and may consider data of the vulnerability trigger and/or vulnerability signature associated with the origin of the vulnerability trigger (e.g., the originating computer and/or IP address of the vulnerability trigger); the frequency of the vulnerability trigger (e.g., how often the vulnerability trigger has been transmitted in the past based on its vulnerability signature); the techniques of the vulnerability trigger (e.g., specific techniques used by the vulnerability trigger to access and configure the computing environment component(s)); the motives of the vulnerability trigger (e.g., the motive behind attacking particular computing environments and associated computing environment component(s)); the experience of the vulnerability trigger (e.g., how the vulnerability trigger is configured to interact with the computing environment components as compared to past vulnerability triggers and signatures and their associated configurations); and/or the like.

As used herein, the signature model may refer to a machine learning model configured to determine details regarding the representation of the vulnerability language for the vulnerability trigger, and may consider data of the vulnerability trigger and/or vulnerability signature associated with the access of the vulnerability trigger (e.g., the access of the vulnerability trigger to certain computing environment components); the severity of the vulnerability trigger (e.g., the severity of the affects to the computing environment components from the vulnerability trigger and/or the severity of how important the computing environment components are to the entire computing system and/or entity organization associated with the computing system); the stakeholder associated with the vulnerability trigger (e.g., the stakeholder associated with the computing system that the vulnerability trigger is attempting to access and interact with, whereby the stakeholder may be a particular intended victim of the creator of the vulnerability trigger); the community of the vulnerability trigger (e.g., the community the stakeholder associated with the computing system is a part of, such as a financial institution community); and/or the like.

As used herein, the misuse model may refer to a machine learning model configured to determine details regarding the effects of the vulnerability trigger on the computing system and its computing system components, and may consider data of the vulnerability trigger and/or vulnerability signature associated with the capacity of the vulnerability trigger (e.g., the capacity of the vulnerability to affect a number of computing environment components and particular computing environment components which may comprise greater security measures); the tools of the vulnerability trigger (e.g., the particular tools used by the vulnerability trigger to affect the computing environment components, which may be used to identify previous vulnerability triggers that match the current vulnerability trigger); the protocol of the vulnerability trigger (e.g., a particular order of computing environment components affected by the vulnerability trigger); the schema of the vulnerability trigger (e.g.,); and/or the like.

As would be understood by a person of ordinary skill in the art, each of the machine learning models herein described (e.g., the region model, the author model, the signature model, and/or the misuse model) may be trained with each of the data described herein (e.g., origin data, frequency data, target data, group data, experience data, technique data, motive data, access data, severity data, stakeholder data, community data, capacity data, tool data, protocol data, schema data, and/or the like) and may consider each type of data described herein when considering the current vulnerability trigger.

For instance, and in some embodiments, each of the machine learning models (singularly and/or in combination) may be configured to assess the parsed data of the vulnerability trigger to determine whether the current vulnerability trigger has previously been used in the computing system and/or in a similar computing system and whether at least one small fix has previously been used. Thus, and in some embodiments, where the current vulnerability trigger and associated vulnerability signature has been used and a potential fix has been used to temporarily fix the vulnerability, the vulnerability fix system may use the same and/or similar potential fix for the current vulnerability trigger. In some embodiments, the vulnerability fix system (through the use of the heuristics model and the associated machine learning model(s)) may determine a similar potential fix for the current vulnerability trigger based on previously generated fixes for a similar vulnerability trigger. Such an embodiment of using previous potential fixes for a current vulnerability trigger is described in further detail below with respect to FIG. 8.

In some embodiments, the vulnerability assessment engine may further comprise a potential fix generator engine which may comprise a long-short term memory network configured to generate a potential fix for the at least one computing environment component affected by the vulnerability trigger. Such an embodiment is described in further detail below with respect to block 310 and FIGS. 4 and 7.

As shown in block 308, the process flow 300 may include the step of generating, based on the vulnerability assessment environment, vulnerability assessment data comprising at least one computing environment component associated with the vulnerability trigger. By way of non-limiting example, the vulnerability fix system may generate (via the vulnerability assessment environment) vulnerability assessment data for the vulnerability trigger, whereby the vulnerability assessment data may at least identify the computing environment components that will be affected (e.g., the computing environment components and the associated potential misuses based on the vulnerability trigger) by the vulnerability trigger. In some embodiments, the vulnerability assessment data may comprise the data regarding the region of the vulnerability trigger, author of the vulnerability trigger, data of the vulnerability signature, and/or misuse data of the vulnerability trigger.

As shown in block 310, the process flow 300 may include the step of applying a long short-term memory (LSTM) network model to the vulnerability assessment data to generate at least one potential fix for the at least one computing environment component associated with the vulnerability trigger. By way of non-limiting example, the vulnerability fix system may apply an LSTM network model to at least the vulnerability assessment data generated in order to determine at least one potential fix for the vulnerability trigger. The at least one potential fix may be based on a previous vulnerability trigger and associated previous fix and/or based on a new potential fix which is determined by the LSTM network model determining which potential fix(es) may work for the vulnerability trigger and the computing environment component(s). In some embodiments, the at least one potential fix may comprise a plurality of potential fixes. Thus, and in some embodiments, the vulnerability fix system may generate a plurality of potential fixes that may be assessed for each vulnerability and for each computing environment component, whereby each potential fix may be tested in a similar isolated environment as the vulnerability assessment environment (e.g., a potential fix assessment environment).

As shown in block 312, the process flow 300 may include the step of inputting the at least one potential fix to the at least one potential fix assessment environment. By way of non-limiting example, the vulnerability fix system may input the at least one potential fix into at least one potential fix environment, whereby the at least one potential fix environment may comprise a plurality of potential fix environments which are each configured to test and/or assess a singular potential fix against the vulnerability and its associated effect on the computing environment component(s). In some embodiments, and in order to streamline the analysis and incorporation of a potential fix that will fix the vulnerability, the vulnerability fix system will generate a plurality of potential fixes for the vulnerability trigger and test each of the potential fixes in parallel within the potential fix assessment environments.

In some embodiments, the at least one potential fix assessment environment may comprise an isolated simulation of a computing environment and the at least one computing environment component associated with the vulnerability trigger, whereby the at least one potential fix assessment environment may be configured to test each of the potential fixes for the computing environment by simulating the computing environment with the vulnerability trigger and associated data after the vulnerability trigger has caused misuse of the computing environment component(s). In some embodiments, the at least one potential fix may be monitored within the potential fix assessment environment, and such embodiments are described in further detail below with respect to FIG. 6.

As shown in block 314, the process flow 300 may include the step of generating, based on the at least one potential fix assessment environment, a functionality confidence metric and a vulnerability confidence metric for the at least one potential fix associated with the at least one computing environment component.

As used herein, the terms "metric" and "threshold" may refer to a numerical value such as a value between zero and ten, a value between zero and one-hundred, and/or the like; a grade such as a letter grade comprising at least one of an A, B, C, D, or F; and/or the like. Thus, and as used herein, the terms "confidence metric" and "confidence threshold" (e.g., as used for the functionality confidence metric, the vulnerability confidence metric, the functionality confidence threshold, and the vulnerability confidence threshold) refers to a valuation of how well the potential fix is working for the computing environment component based on its continued functionality (e.g., based on what the computing environment component should be doing and whether it is still maintaining its functionality with the potential fix) and based on whether the vulnerability/misuse of the computing environment component has been mitigated enough to allow the computing environment component to continue to function without allowing the vulnerability to misuse the computing environment component.

By way of non-limiting example, the functionality confidence metric may be generated by the vulnerability fix system by monitoring the computing environment component(s) in the potential fix assessment environment(s) and determining whether the computing environment component(s) that is affected by the vulnerability trigger can continue to function (and at what level the computing environment component can continue to function) with the potential fix. The generation of the functionality confidence metric is discussed in further detail below with respect to FIG. 6.

Similarly, and by way of non-limiting example, the vulnerability confidence metric may be generated by the vulnerability fix system by monitoring the computing environment component(s) in the potential fix assessment environment(s) and determining whether the computing environment component(s) that is affected by the vulnerability trigger and whether the vulnerability trigger and associated misuse are still affecting the expected computing environment component(s) (e.g., expected based on the vulnerability assessment environment). The generation of the vulnerability confidence metric is discussed in further detail below with respect to FIG. 6.

As shown in block 316, the process flow 300 may include the step of identifying a vulnerability confidence threshold and a functionality confidence threshold based on the at least one computing environment component and the at least one potential fix. By way of non-limiting example, the vulnerability fix system may identify a vulnerability confidence threshold and a functionality confidence threshold to compare to the vulnerability confidence metric and the functionality confidence metric, respectively. Thus, and in some embodiments, the confidence threshold (e.g., the vulnerability confidence threshold and functionality confidence threshold) may be used as a measurement to determine whether a potential fix should be implemented to the real-world computing environment to fix the misuse caused by the vulnerability trigger.

By way of non-limiting example, and in order to implement the potential fixes best fit for the vulnerability trigger and the computing environment component(s), the vulnerability confidence threshold may be set to a low value and/or grade, and the functionality confidence threshold may be set to a high value and/or grade to allow greater functionality for the computing environment component(s) with lowered vulnerability misuse. In some embodiments, the vulnerability fix system may identify the vulnerability confidence threshold and the functionality confidence threshold based on an input by a manager of the vulnerability fix system, an input by a user of the vulnerability fix system, and/or the like.

As shown in block 318, the process flow 300 may include the step of implementing the at least one potential fix for the at least one computing environment component. By way of non-limiting example, the vulnerability fix system may implement the at least one potential fix for the computing system and/or the specific computing environment component(s) which is being misused by the vulnerability trigger. Such embodiments are described in further detail below for when to implement the potential fix(es) and when not to implement the potential fix(es).

In some embodiments, and as shown in bock 320, the process flow 300 may include the step of implementing—in an instance where the functionality confidence metric meets the functionality confidence threshold and the vulnerability confidence metric meets the vulnerability confidence threshold—the at least one potential fix to the at least one computing environment component. By way of non-limiting example, the vulnerability fix system may implement a potential fix where the functionality confidence metric meets the functionality confidence threshold (i.e., functionality confidence metric is higher than the functionality confidence threshold) and the vulnerability confidence metric and vulnerability confidence metric meets the vulnerability confidence threshold (i.e., the vulnerability confidence metric is lower than the vulnerability confidence threshold). Thus, and where the functionality confidence threshold is 90% and the functionality confidence metric for a particular potential fix is 95% and where the vulnerability confidence threshold is 10% and the vulnerability confidence metric is 5% for the potential fix, the vulnerability fix system may implement the potential fix in the computing system.

In some embodiments, and as shown in bock 322, the process flow 300 may include the step of not implementing—in an instance where the functionality confidence metric does not meet the functionality confidence threshold or the vulnerability confidence metric does not meet the vulnerability confidence threshold—the at least one potential fix to the at least one computing environment component. By way of non-limiting example, the vulnerability fix system may not implement the potential fix(es) which do are not associated with a vulnerability functionality metric that does not meet the vulnerability confidence threshold (i.e., the vulnerability functionality metric is higher than the vulnerability confidence threshold) or where the functionality confidence metric does not meet the functionality confidence threshold (i.e., the functionality confidence metric is lower than the functionality confidence threshold).

FIG. 4 illustrates a process flow 400 for generating an updated potential fix, in accordance with an embodiment of the disclosure. In some embodiments, a system (e.g., similar to one or more of the systems described herein with respect to FIGS. 1A-1C and 2) may perform one or more of the steps of process flow 400. For example, a vulnerability fix system (e.g., the system 130 described herein with respect to FIG. 1A-1C) may perform the steps of process 400, which may further be configured to implement at least one machine learning and/or an artificial intelligence engine (e.g., such as machine learning model 200 shown in FIG. 2) to perform the steps of process 400.

As shown in block 402, the process flow 400 may include the step of inputting—in response to the at least one potential fix not being implemented—the at least one potential fix associated with the at least one computing environment component to a potential fix generator engine, wherein the potential fix generator engine comprises the long short-term memory network model. By way of non-limiting example, the vulnerability fix system may input the at least one potential fix which was not implemented (e.g., not implemented in block 322) back into the potential fix generator engine comprising the LSTM network memory. In this manner, the vulnerability fix system may regenerate and/or generate an updated version of the potential fix(es) not implemented to allow the updated potential fix(es) to be re-sent to the potential fix assessment environment for further testing and implementation. Thus, and in some embodiments, the LSTM network may be configured to determine and/or generate new potential fixes for the vulnerability trigger and associated misuse of computing environment components when the previous potential fix(es) did not meet the functionality confidence threshold and the vulnerability confidence threshold.

As shown in block 404, the process flow 400 may include the step of generating—by the potential fix generator engine—at least one updated potential fix, wherein the at least one updating potential fix comprises at least one of a repackaged at least one potential fix, a reprioritization of the at least one potential fix, and/or at least one new potential fix. By way of non-limiting example, the vulnerability fix system may generate at least one updated potential fix based on the data regarding the previous potential fix(es) and associated failure to meet the vulnerability confidence threshold and functionality confidence threshold and determine which potential fix(es) got the closest to meeting the vulnerability confidence threshold and functionality confidence threshold. Thus, and in some embodiments, the vulnerability fix system may determine based on the closest potential fix(es) which potential fix(es) to slightly change and/or update to meet the vulnerability confidence threshold and the functionality confidence threshold.

In some embodiments, the at least one updated potential fix comprises a repackaging of the at least one previous potential fix, whereby the repackaging may comprise slightly changing the previous potential fix and re-uploading the repackaged previous potential fix to the potential fix assessment environment for analysis. In some embodiments, the at least one updated potential fix comprises a reprioritization of the at least one potential fix such that any of the previous potential fix(es) not tested by the potential fix assessment environment because they were not prioritized high enough (e.g., where a limited number of potential fix assessment environments are available), then the vulnerability fix system may reprioritize the previous potential fixes not tested to be tested at a next time. In some embodiments, the at least one updated potential fix comprises a brand new potential fix to be generated by the potential fix generator engine, such that the LSTM network model of the potential fix generator engine re-generates the at least one potential fix to be a completely new option for the potential fixes to input to the potential fix assessment environment.

FIG. 5 illustrates a process flow 500 for implementing the OEM fix(es) to the computing environment component(s), in accordance with an embodiment of the disclosure. In some embodiments, a system (e.g., similar to one or more of the systems described herein with respect to FIGS. 1A-1C and 2) may perform one or more of the steps of process flow 500. For example, a vulnerability fix system (e.g., the system 130 described herein with respect to FIG. 1A-1C) may perform the steps of process 500, which may further be configured to implement at least one machine learning and/or an artificial intelligence engine (e.g., such as machine learning model 200 shown in FIG. 2) to perform the steps of process 500.

As shown in block 502, the process flow 500 may include the step of receiving an original equipment manufacturer (OEM) fix indication, wherein the OEM fix indication is associated with the vulnerability trigger, wherein the OEM fix indication is associated with at least one OEM fix. In some embodiments, the vulnerability fix system may receive an indication from an OEM of a particular computing environment component that a fix has been generated by the original manufacturer of the computing environment component to address the misuse of the vulnerability trigger. Such an OEM fix indication may comprise an electronic communication to each of the licensees/owners of the computing environment component (e.g., via an email, letter, a text message, a message indicating a new version of the computing environment component has been created, and/or the like) to let the licensees/owners know the misuse based on the vulnerability trigger may be fixed by implementing the OEM fix. In some embodiments, the OEM fix indication may be generated by the vulnerability fix system by web-scraping to determine whether any of its current computing environment components comprise and/or are associated with a potential OEM fix.

As shown in block 504, the process flow 500 may include the step of removing—in response to the OEM fix indication—the at least one potential fix that was implemented from the at least one computing environment component. By way of non-limiting example, the vulnerability fix system may, upon a determination that at least one OEM fix is available for at least one computing environment component, remove and/or uninstall the at least one potential fix implemented (e.g., in block 320) from the computing environment and its associated computing environment component(s).

As shown in block 506, the process flow 500 may include the step of implementing the at least one OEM fix to the at least one computing environment component. Further, and for instance, once the potential fix previously implemented by the vulnerability fix system has been removed, the vulnerability fix system may then implement the at least one OEM fix identified based on the OEM fix indication. Such a removal of the implemented potential fix and implementation of the OEM fix(es) may allow the vulnerability fix system to create a temporary fix for the computing environment and computing environment components without changing and/or accessing the code of the computing environment component(s) until the OEM fix has been implemented. Thus, and in some embodiments, the potential fix may not be intended to permanently change or even temporarily change the code of the computing environment component, which may only be accessed by certain vendors of the computing environment component. Rather, the potential fix implemented is meant to be available to regular licensees and owners of computing environment components who may not have access to the code to patch the misuse of the vulnerability trigger.

FIG. 6 illustrates a process flow 600 for generating the vulnerability confidence metric and functionality confidence metric and determining the vulnerability confidence threshold and the functionality confidence threshold, in accordance with an embodiment of the disclosure. In some embodiments, a system (e.g., similar to one or more of the systems described herein with respect to FIGS. 1A-1C and 2) may perform one or more of the steps of process flow 600. For example, a vulnerability fix system (e.g., the system 130 described herein with respect to FIG. 1A-1C) may perform the steps of process 600, which may further be configured to implement at least one machine learning and/or an artificial intelligence engine (e.g., such as machine learning model 200 shown in FIG. 2) to perform the steps of process 600.

As shown in block 602, the process flow 600 may include the step of monitoring—based on inputting the at least one potential fix to the at least one potential fix assessment environment—the at least one potential fix in the at least one potential fix assessment environment. In some embodiments, the at least one potential fix may be monitored within the at least one potential fix assessment environment for a pre-determined period, whereby the pre-determined period may be pre-set by a manager of the vulnerability fix system, by a user of the vulnerability fix system (e.g., a manager of the computing system associated with the vulnerability trigger and potential fix(es) being tested), and/or the like. In some embodiments, each potential fix of the at least one potential fix may be monitored by the associated potential fix assessment environment to generate the functionality confidence metric and the vulnerability confidence metric. Such a functionality confidence metric and the vulnerability confidence metric are discussed in further detail below.

As shown in block 604, the process flow 600 may include the step of analyzing the at least one potential fix and the associated at least one computing environment component to determine the functionality confidence metric, wherein the functionality confidence metric is based on a functionality of the at least one computing environment component with the at least one potential fix. As explained above, the functionality confidence metric may be generated by the vulnerability fix system by monitoring the computing environment component(s) in the potential fix assessment environment(s) and determining whether the computing environment component(s) that is affected by the vulnerability trigger can continue to function (and at what level the computing environment component can continue to function) with the potential fix. Thus, and by way of non-limiting example, the vulnerability fix system may determine the computing environment component is only operating at 50% based on its previous operating levels and may assign the potential fix a 50% functionality confidence metric.

As shown in block 606, the process flow 600 may include the step of analyzing the at least one potential fix and the associated at least one computing environment component to determine the vulnerability confidence metric, wherein the vulnerability confidence metric is based on a potential misuse of the at least one computing environment component with the at least one potential fix. As discussed above, and by way of non-limiting example, the vulnerability confidence metric may be generated by the vulnerability fix system by monitoring the computing environment component(s) in the potential fix assessment environment(s) and determining whether the computing environment component(s) that is affected by the vulnerability trigger and whether the vulnerability trigger and associated misuse are still affecting the expected computing environment component(s) (e.g., expected based on the vulnerability assessment environment). Thus, and by way of non-limiting example, the vulnerability fix system may determine a vulnerability trigger and its associated effect on a computing environment component is still affecting the component at a 20% level despite the use of the potential fix (e.g., as compared to the vulnerability trigger and associated data assessed in the vulnerability assessment environment) and may generate the vulnerability confidence metric to be 20%.

In some embodiments, and as shown in block 608, the process flow 600 may include the step of determining the vulnerability confidence threshold based on the at least one computing environment component and an associated vulnerability allowance. By way of non-limiting example, and in some embodiments, the vulnerability confidence threshold may be determined by a user of the vulnerability fix system, a manager of the vulnerability fix system, and/or the like. However, and in some embodiments, the vulnerability fix system itself may determine the vulnerability confidence threshold based on previous instances of vulnerability triggers and associated misuse and the associated accepted fixes that have been allowed by the manager of the vulnerability fix system, the user of the vulnerability fix system, and/or the like. In some embodiments, the vulnerability fix system may comprise a machine learning model (such as the machine learning models described in the vulnerability assessment environment and/or such as a machine learning model configured specifically to monitor and test the potential fixes) configured to determine the vulnerability confidence metric and vulnerability confidence threshold. Thus, the vulnerability fix system may be trained based on previous instances of potential fixes and associated accepted vulnerability confidence metrics for particular computing environment components to use the same accepted vulnerability confidence metrics for current potential fixes of computing environment component(s) of the same type. For instance, and where a computing environment component is identified as being very critical to the overall computing environment and/or overall entity's organization associated with the computing environment, then the vulnerability fix system may determine the current vulnerability confidence threshold should be as low as other computing environment components which have been just as critical. Thus, and in some embodiments, the critical level of the computing environment component may be associated with a critical score (e.g., the higher the critical score, the more greater the computing environment component is to the computing environment and/or entity's organization).

In some embodiments, and as shown in block 610, the process flow 600 may include the step of determining the functionality confidence threshold based on the at least one computing environment component and an associated critical score. By way of non-limiting example, and in some embodiments, the functionality confidence threshold may be determined by a user of the vulnerability fix system, a manager of the vulnerability fix system, and/or the like. However, and in some embodiments, the vulnerability fix system itself may determine the functionality confidence threshold based on previous instances of vulnerability triggers and associated misuse and the associated accepted fixes that have been allowed by the manager of the vulnerability fix system, the user of the vulnerability fix system, and/or the like. In some embodiments, the vulnerability fix system may comprise a machine learning model (such as the machine learning models described in the vulnerability assessment environment and/or such as a machine learning model configured specifically to monitor and test the potential fixes) configured to determine the functionality confidence metric and functionality confidence threshold. Thus, the vulnerability fix system may be trained based on previous instances of potential fixes/vulnerability triggers and associated accepted functionality confidence metrics for particular computing environment components to use the same accepted functionality confidence metrics for current computing environment component(s) of the same type. For instance, and where a computing environment component is identified as being very critical to the overall computing environment and/or overall entity's organization associated with the computing environment, then the vulnerability fix system may determine the current functionality confidence threshold should be as high as other computing environment components which have been just as critical.

FIG. 7 illustrates a process flow 700 for receiving entity organization data and pattern data for the long-short term network memory, in accordance with an embodiment of the disclosure. In some embodiments, a system (e.g., similar to one or more of the systems described herein with respect to FIGS. 1A-1C and 2) may perform one or more of the steps of process flow 700. For example, a vulnerability fix system (e.g., the system 130 described herein with respect to FIG. 1A-1C) may perform the steps of process flow 700, which may further be configured to implement at least one machine learning and/or an artificial intelligence engine (e.g., such as machine learning model 200 shown in FIG. 2) to perform the steps of process 700.

As shown in block 702, the process flow 700 may include the step of receiving, by the long short-term memory network model, entity organization data associated with the at least one computing environment component. By way of non-limiting example, the vulnerability fix system may receive—by the LSTM network model—entity organization data of the computing environment associated the vulnerability trigger, whereby the entity organization data may be used by the vulnerability fix system to determine categories and/or criticality levels of the computing environment components within the computing environment and within the entity's organization, as a whole. In some embodiments, block 702 and its associated process may precede the steps outlined in blocks 602, 604, 606, 608, and/or 610. Thus, and in some embodiments, the vulnerability fix system may be configured (via the LSTM network model and/or the machine learning model(s)) to analyze the entity organization data associated with the at least one computing environment component to make determinations on at least one of the at least one potential fix, the vulnerability confidence threshold, and/or the functionality confidence threshold.

As shown in block 704, the process flow 700 may include the step of receiving, by the long short-term memory network model, pattern data associated with at least one previous vulnerability instance. By way of non-limiting example, the vulnerability fix system may be configured to generate pattern data regarding previous instances of potential fixes and associated computing environment components and transmit to the LSTM network memory for parsing and analyzation. Thus, and in some embodiments, the vulnerability fix system may generate pattern data based on past instances of vulnerability triggers (and associated vulnerability data), the computing environment components affected by the vulnerability triggers, and the fixes used for the computing environment components affected by the vulnerability triggers. In this manner, the vulnerability fix system may train the LSTM network memory to identify which fixes were used for previous vulnerability triggers and which potential fixes to use for a current vulnerability trigger.

In some embodiments, and where a current vulnerability trigger is the same as a previous vulnerability trigger and/or is similar to a previous vulnerability trigger (e.g., affects the same computing environment component as the previous vulnerability trigger), the LSTM network model may transmit the same previous fix to the potential fix assessment environment for testing against the current vulnerability trigger. Thus, and in this manner, the vulnerability fix system may streamline which potential fix(es) to test for the current vulnerability trigger in an efficient, accurate, and automatic manner, based on the vulnerability fix system's prior experience and/or pattern analysis.

FIG. 8 illustrates a process flow 800 for determining a potential fix based on previous small fix instance, in accordance with an embodiment of the disclosure. In some embodiments, a system (e.g., similar to one or more of the systems described herein with respect to FIGS. 1A-1C and 2) may perform one or more of the steps of process flow 800. For example, a vulnerability fix system (e.g., the system 130 described herein with respect to FIG. 1A-1C) may perform the steps of process 800, which may further be configured to implement at least one machine learning and/or an artificial intelligence engine (e.g., such as machine learning model 200 shown in FIG. 2) to perform the steps of process 800.

As shown in block 802, the process flow 800 may include the step of comparing the parsed data associated with the vulnerability trigger with a vulnerability signature library, wherein the vulnerability signature library comprises at least one previous vulnerability trigger instance and associated previous small fix instance. By way of non-limiting example, the vulnerability fix system may compare the parsed data of the vulnerability trigger (e.g., from block 304) with a vulnerability signature library, whereby the vulnerability signature library may comprise each of the vulnerability signatures and associated data for each of the previous vulnerability trigger instances received and/or identified by the vulnerability fix system. Further, and in some embodiments, the vulnerability signature library may comprise data regarding the origin data, the frequency data, the target data, the group data, the experience data, the technique(s) data, the motive(s) data, the access data, the severity data, the stakeholder data, the community data, the capacity data, the tool(s) data, the protocol data, the schema data, and/or the like, for the previous vulnerability triggers. In this manner, and the vulnerability fix system may determine—by matching and/or closely resembling the data of the current vulnerability trigger to a previous vulnerability trigger instance—which previous vulnerability trigger matches or closely resembles the current vulnerability trigger and, thus, which previous fix used for the previous vulnerability trigger may be used for the current vulnerability trigger. The term "compare," "comparison," and/or the like refers to a matching and/or evaluating the closeness of the current vulnerability trigger to the previous vulnerability trigger instance(s), and the associated data of each.

As shown in block 804, the process flow 800 may include the step of determining the at least one potential fix based on the previous small fix instance, wherein, in an instance where the parsed data associated with the vulnerability trigger matches the previous vulnerability trigger instance associated with the previous small fix instance. By way of non-limiting example, the vulnerability fix system may determine—based on the comparison—whether at least one potential fix associated with a previous small fix instance (i.e., a previous fix for a previous vulnerability trigger instance) may be implemented in the computing environment for the current vulnerability trigger. Thus, and in the embodiment where the parsed data of the current vulnerability trigger matches the data of the previous vulnerability trigger, the vulnerability fix system may implement the same small fix instance as the potential fix in the computing environment for the current vulnerability trigger. However, and in the embodiment where the parsed data of the current vulnerability trigger does not exactly match the data of the previous vulnerability trigger, the vulnerability fix system may determine the parsed data of the current vulnerability trigger closely resembles the data of the previous vulnerability trigger and may test the previous small fix instance in the potential fix assessment environment to determine whether to implement the previous small fix for the current vulnerability trigger (e.g., where the functionality confidence threshold and the vulnerability confidence threshold are met).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detecting and implementing vulnerability fixes, the system comprising:
    a memory device with computer-readable program code stored thereon;
    at least one processing device operatively coupled to the at least one memory device and at least one communication device, wherein executing the computer-readable code is configured to cause the at least one processing device to:
    receive a vulnerability trigger;
    parse data associated with the vulnerability trigger;
    generate a vulnerability assessment environment and apply the parsed data of the vulnerability trigger;
    generate, based on the vulnerability assessment environment, vulnerability assessment data comprising at least one computing environment component associated with the vulnerability trigger;
    apply a long short-term memory network model to the vulnerability assessment data to generate at least one potential fix for the at least one computing environment component associated with the vulnerability trigger;
    input the at least one potential fix to at least one potential fix assessment environment;
    generate, based on the at least one potential fix assessment environment, a functionality confidence metric and a vulnerability confidence metric for the at least one potential fix associated with the at least one computing environment component;
    identify a vulnerability confidence threshold and a functionality confidence threshold based on the at least one computing environment component and the at least one potential fix; and
    implement the at least one potential fix for the at least one computing environment component,
        wherein, in an instance where the functionality confidence metric meets the functionality confidence threshold and the vulnerability confidence metric meets the vulnerability confidence threshold, implement the at least one potential fix to the at least one computing environment component, or
        wherein, in an instance where the functionality confidence metric does not meet the functionality confidence threshold or the vulnerability confidence metric does not meet the vulnerability confidence threshold, do not implement the at least one potential fix to the at least one computing environment component.

2. The system of claim 1, wherein the at least one processing device is further configured to:
    input, in response to the at least one potential fix not being implemented, the at least one potential fix associated with the at least one computing environment component to a potential fix generator engine, wherein the potential fix generator engine comprises the long short-term memory network model; and
    generate, by the potential fix generator engine, at least one updated potential fix, wherein the at least one updated potential fix comprises at least one of a repackaged at least one potential fix, a reprioritization of the at least one potential fix, or at least one new potential fix.

3. The system of claim 1, wherein the at least one processing device is further configured to:
    receive an original equipment manufacturer (OEM) fix indication, wherein the OEM fix indication is associated with the vulnerability trigger, wherein the OEM fix indication is associated with at least one OEM fix;

remove, in response to the OEM fix indication, the at least one potential fix that was implemented from the at least one computing environment component; and implement the at least one OEM fix to the at least one computing environment component.

4. The system of claim 1, wherein the at least one processing device is further configured to:

monitor, based on inputting the at least one potential fix to the at least one potential fix assessment environment, the at least one potential fix in the at least one potential fix assessment environment;

analyze the at least one potential fix and the associated at least one computing environment component to determine the functionality confidence metric, wherein the functionality confidence metric is based on a functionality of the at least one computing environment component with the at least one potential fix; and analyze the at least one potential fix and the associated at least one computing environment component to determine the vulnerability confidence metric, wherein the vulnerability confidence metric is based on a potential misuse of the at least one computing environment component with the at least one potential fix.

5. The system of claim 4, wherein the at least one processing device is further configured to:

determine the vulnerability confidence threshold based on the at least one computing environment component and an associated vulnerability allowance; and determine the functionality confidence threshold based on the at least one computing environment component and an associated critical score.

6. The system of claim 1, wherein the at least one processing device is further configured to:

receive, by the long short-term memory network model, entity organization data associated with the at least one computing environment component; and receive, by the long short-term memory network model, pattern data associated with at least one previous vulnerability instance.

7. The system of claim 1, wherein the vulnerability trigger is associated with a vulnerability and the vulnerability is a zero-day vulnerability.

8. The system of claim 1, wherein the vulnerability assessment environment comprises an isolated simulation of a computing environment associated with the vulnerability trigger.

9. The system of claim 1, wherein the at least one potential fix assessment environment comprises an isolated simulation of a computing environment and the at least one computing environment component associated with the vulnerability trigger.

10. The system of claim 9, wherein the at least one potential fix comprises a plurality of potential fixes, and wherein the at least one potential fix assessment environment comprises a plurality of potential fix assessment environments configured to assess each potential fix of the plurality of potential fixes for each computing environment component.

11. The system of claim 1, wherein the at least one processing device is further configured to:

compare the parsed data associated with the vulnerability trigger with a vulnerability signature library, wherein the vulnerability signature library comprises at least one previous vulnerability trigger instance and an associated previous small fix instance; and determine the at least one potential fix based on the associated previous small fix instance, wherein, in an instance where the parsed data associated with the vulnerability trigger matches the at least one previous vulnerability trigger instance associated with the associated previous small fix instance.

12. The system of claim 1, wherein the vulnerability assessment environment comprises at least one heuristic model, and wherein the at least one heuristic model comprises at least one of a region model, an author model, a signature model, or a misuse model.

13. The system of claim 12, wherein the at least one heuristic model comprises at least one machine learning model configured to determine the at least one potential fix based on at least one previous instance and associated with at least one previous fix, and at least one potential misuse for the vulnerability trigger.

14. The system of claim 1, wherein the at least one potential fix is monitored in the at least one potential fix assessment environment for a pre-determined period to determine at least one of the functionality confidence metric or the vulnerability confidence metric.

15. A computer program product for detecting and implementing vulnerability fixes, wherein the computer program product comprises at least one non-transitory computer-readable medium having computer-readable program code portions embodied therein, the computer-readable program code portions which when executed by a processing device are configured to cause the processing device to:

receive a vulnerability trigger;

parse data associated with the vulnerability trigger;

generate a vulnerability assessment environment and apply the parsed data of the vulnerability trigger;

generate, based on the vulnerability assessment environment, vulnerability assessment data comprising at least one computing environment component associated with the vulnerability trigger;

apply a long short-term memory network model to the vulnerability assessment data to generate at least one potential fix for the at least one computing environment component associated with the vulnerability trigger;

input the at least one potential fix to at least one potential fix assessment environment;

generate, based on the at least one potential fix assessment environment, a functionality confidence metric and a vulnerability confidence metric for the at least one potential fix associated with the at least one computing environment component;

identify a vulnerability confidence threshold and a functionality confidence threshold based on the at least one computing environment component and the at least one potential fix; and implement the at least one potential fix for the at least one computing environment component, wherein, in an instance where the functionality confidence metric meets the functionality confidence threshold and the vulnerability confidence metric meets the vulnerability confidence threshold, implement the at least one potential fix to the at least one computing environment component, or wherein, in an instance where the functionality confidence metric does not meet the functionality confidence threshold or the vulnerability confidence metric does not meet the vulnerability confidence threshold, do not implement the at least one potential fix to the at least one computing environment component.

16. The computer program product of claim 15, wherein the computer-readable program code portions which when executed by the processing device are further configured to cause the processing device to:

input, in response to the at least one potential fix not being implemented, the at least one potential fix associated with the at least one computing environment component to a potential fix generator engine, wherein the potential fix generator engine comprises the long short-term memory network model; and generate, by the potential fix generator engine, at least one updated potential fix, wherein the at least one updated potential fix comprises at least one of a repackaged at least one potential fix, a reprioritization of the at least one potential fix, or at least one new potential fix.

17. The computer program product of claim 15, wherein the computer-readable program code portions which when executed by the processing device are further configured to cause the processing device to:

monitor, based on inputting the at least one potential fix to the at least one potential fix assessment environment, the at least one potential fix in the at least one potential fix assessment environment;

analyze the at least one potential fix and the associated at least one computing environment component to determine the functionality confidence metric, wherein the functionality confidence metric is based on a functionality of the at least one computing environment component with the at least one potential fix; and analyze the at least one potential fix and the associated at least one computing environment component to determine the vulnerability confidence metric, wherein the vulnerability confidence metric is based on a potential misuse of the at least one computing environment component with the at least one potential fix.

18. A computer-implemented method for detecting and implementing vulnerability fixes, the computer-implemented method comprising:

receiving a vulnerability trigger;

parsing data associated with the vulnerability trigger;

generating a vulnerability assessment environment and apply the parsed data of the vulnerability trigger;

generating, based on the vulnerability assessment environment, vulnerability assessment data comprising at least one computing environment component associated with the vulnerability trigger;

applying a long short-term memory network model to the vulnerability assessment data to generate at least one potential fix for the at least one computing environment component associated with the vulnerability trigger;

inputting the at least one potential fix to at least one potential fix assessment environment;

generating, based on the at least one potential fix assessment environment, a functionality confidence metric and a vulnerability confidence metric for the at least one potential fix associated with the at least one computing environment component;

identifying a vulnerability confidence threshold and a functionality confidence threshold based on the at least one computing environment component and the at least one potential fix; and implementing the at least one potential fix for the at least one computing environment component, wherein, in an instance where the functionality confidence metric meets the functionality confidence threshold and the vulnerability confidence metric meets the vulnerability confidence threshold, implement the at least one potential fix to the at least one computing environment component, or wherein, in an instance where the functionality confidence metric does not meet the functionality confidence threshold or the vulnerability confidence metric does not meet the vulnerability confidence threshold, do not implement the at least one potential fix to the at least one computing environment component.

19. The computer-implemented method of claim 18, further comprising:

inputting, in response to the at least one potential fix not being implemented, the at least one potential fix associated with the at least one computing environment component to a potential fix generator engine, wherein the potential fix generator engine comprises the long short-term memory network model; and generating, by the potential fix generator engine, at least one updated potential fix, wherein the at least one updated potential fix comprises at least one of a repackaged at least one potential fix, a reprioritization of the at least one potential fix, or at least one new potential fix.

20. The computer-implemented method of claim 18, further comprising:

monitoring, based on inputting the at least one potential fix to the at least one potential fix assessment environment, the at least one potential fix in the at least one potential fix assessment environment;

analyzing the at least one potential fix and the associated at least one computing environment component to determine the functionality confidence metric, wherein the functionality confidence metric is based on a functionality of the at least one computing environment component with the at least one potential fix; and analyzing the at least one potential fix and the associated at least one computing environment component to determine the vulnerability confidence metric, wherein the vulnerability confidence metric is based on a potential misuse of the at least one computing environment component with the at least one potential fix.

\* \* \* \* \*